Patented May 13, 1924.

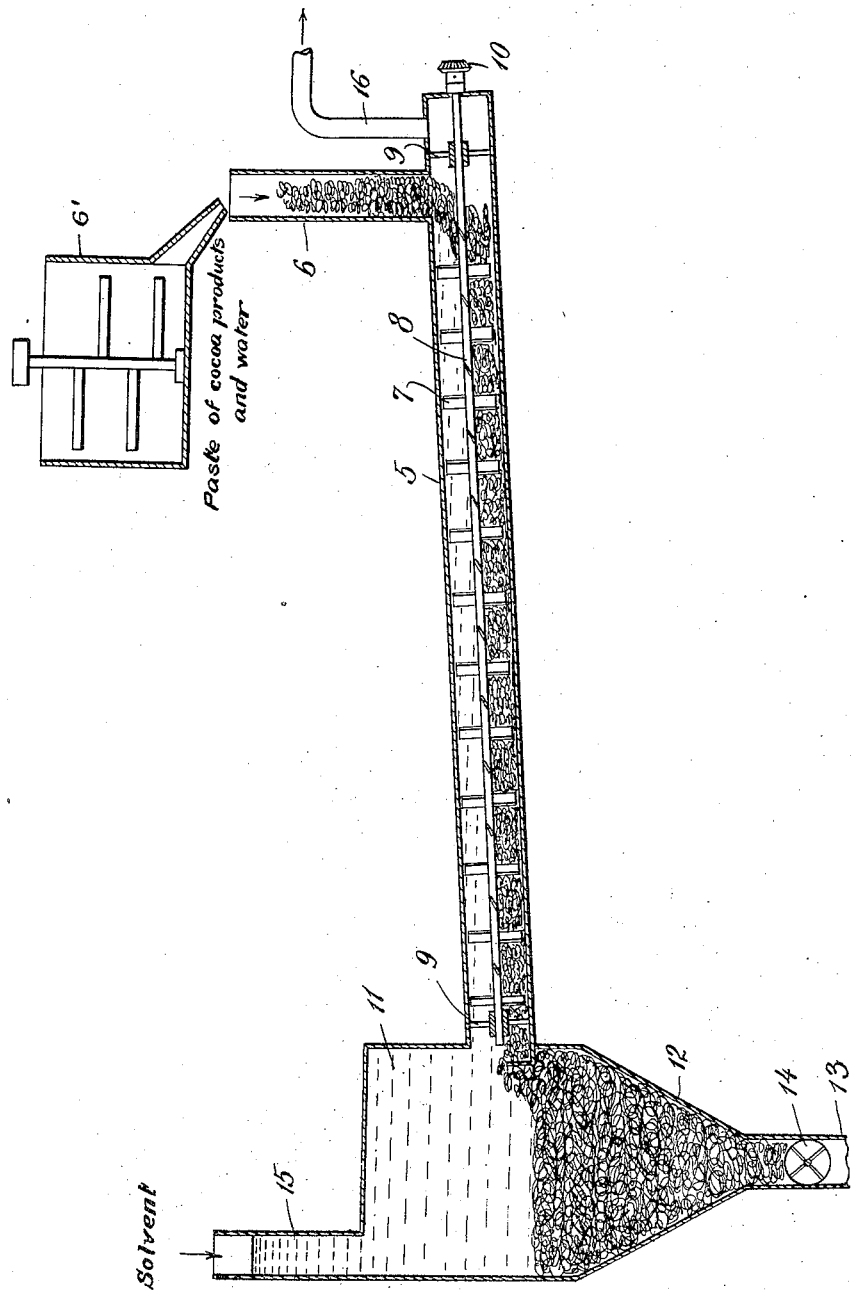

1,494,090

UNITED STATES PATENT OFFICE.

ROBERT ERASTUS WILSON, OF CAMBRIDGE, MASSACHUSETTS, ASSIGNOR TO COCOA PRODUCTS COMPANY OF AMERICA INCORPORATED, A CORPORATION OF DELAWARE.

COUNTERCURRENT EXTRACTION.

Application filed October 8, 1921. Serial No. 506,294.

*To all whom it may concern:*

Be it known that I, ROBERT E. WILSON, a citizen of the United States, residing at Cambridge, in the county of Middlesex, State of Massachusetts, have invented certain new and useful Improvements in Countercurrent Extraction; and I do hereby declare the following to be a full, clear, and exact description of the invention, such as will enable others skilled in the art to which it appertains to make and use the same.

This invention relates to a continuous counter-current method of extraction involving particularly the extraction of soluble material from a liquid or pasty semi-fluid mass by another non-miscible, lighter and more fluid liquid. An application of the invention is involved in the recovery of cocoa butter from cocoa powder in accordance with the principles hereinafter described, but obviously the invention has a broader application.

Considerable difficulty is experienced in the separation of fats, oils and the like from finely divided material owing to the fact that the solid material does not readily separate from the solvent employed. Thus settling is impracticable as a separating expedient, and attempts to filter such material have met with no material success because the solid either clogs a dense filter medium or passes through one of looser structure.

It has been proposed heretofore to accomplish the desired separation by mixing the finely divided solid material with sufficient water to make a pasty mass, thereafter mixing a suitable solvent with the mass to dissolve the fat or oil from the solid. The presence of the water facilitates the solution of the fatty material and changes the nature of the solid so that it settles more readily and separation thus becomes possible. Unfortunately, however, the method described is not adapted to continuous operation. Separate batches of material must be treated with resulting inefficiency and lack of economy.

It is the object of the present invention to provide a continuous counter-current method of extraction whereby substantially complete solution of the fatty material is assured with continuous separation of a highly concentrated solution thereof in the solvent used.

A further object of the invention is the provision of an apparatus capable of use in the application of the method whereby economical and efficient extraction is accomplished.

Further objects and advantages of the invention will be apparent as it is better understood by reference to the following specification and accompanying drawing illustrating an apparatus adapted for use in the operation of the method.

In carrying out the present invention, the solid material is mixed in any suitable manner with a sufficient quantity of water to provide a pasty or semi-fluid mass, the consistency of which may vary so long as the mass is capable of movement through the chamber in which the extraction is accomplished. The mobile mass is then fed in at one end of a suitable apparatus hereinafter described and caused to move continuously therethrough so that it may be withdrawn at the opposite end substantially free from fatty material. During its passage in the manner described, the pasty mass is subjected continuously to the action of a lighter extracting fluid, i. e., a solvent for the fatty material which flows in a direction opposite to the direction of movement of the pasty mass under the influence of a slight difference in head, for example. Thus, the pasty material may be caused to move by gravity through an inclined chamber while the extracting fluid is supplied at the lower end of the chamber in sufficient quantity to wholly or partially fill the same and to overflow from the upper end thereof. Preferably, suitable agitating means are employed within the chamber to insure thorough commingling of the solid with the extracting fluid. At the lower end of the chamber the solid material separates readily from the extracting fluid after contact with the fresh supply thereof which insures extraction of all but traces of fatty material from the solid. The extracting fluid escaping from the upper end of the chamber is a fairly concentrated solution of the fatty material in the solvent. The fatty material may be recovered by appropriate means such as evaporation or steam distillation.

The invention may be best understood by reference to its application to a specific material, namely cocoa powder containing a proportion of cocoa butter to be extracted. The powder is preferably mixed with water in the proportion of one hundred fifty parts of water to one hundred parts of cocoa powder, the mass being agitated until it has a smooth consistency. More or less water will be required, depending upon the particular characteristics of the cocoa powder. The pasty mass is delivered to the upper end of the chamber and flows by gravity therethrough, the effect of gravity being assisted by suitable paddles or scraping devices within the chamber. Approximately two hundred parts of a suitable solvent, benzol for example, will be required to extract the cocoa powder, the proportions varying, of course, with the percentage of cocoa butter in the powder. The admission of the solvent at the lower end of the chamber is regulated in accordance with the requirements and the apparatus is so operated as to allow approximately ten to fifteen minutes for the passage of the pasty mass therethrough. The time required will vary with the particular conditions, but this and other details may be readily determined in treating the particular grade of cocoa powder at hand. The pasty mass settling at the lower end of the chamber is similar to that entering except that most of the fat has been leached out and a comparatively small amount of benzol has been absorbed. This solvent is removed by steam distillation or other suitable means, and the pasty mass is then filtered and dried to remove the excess water, being then suitable for use as fertilizer.

While the advantages of continuous countercurrent extraction of solids with liquids have long been made use of, practical difficulties in making one fluid flow in a direction opposite to another have prevented the use of such a process for extracting one liquid or pasty mass with another liquid.

In the drawing a suitable apparatus for use in practicing the invention is illustrated, it being understood that the details may vary widely and that accordingly no attempt has been made to illustrate all of the numerous possible variations of the structure.

Referring to the drawing, 5 indicates a tubular chamber of sufficient length to permit the passage therethrough of the pasty or semi-liquid mass during a time interval commensurate with the proper extraction of the fatty material. The pasty or semi-fluid mass is supplied through an inlet 6 to the tubular chamber which is inclined to permit the material to flow by gravity toward the outlet from the chamber. The mass may be mixed in any suitable mixing device as indicated at 6' in the accompanying drawing. The travel of the mass is preferably assisted by the operation of stirring arms 7 supported on a shaft 8. The shaft is mounted in bearings 9 which are so arranged as to permit the passage of the semi-fluid mass. The shaft may be driven through a gear 10 or other suitable means from a source of power.

At the lower end of the chamber 5 a receptacle 11 is provided having a conical bottom 12 and an outlet 13 controlled by a valve 14 through which the pasty mass is discharged. The solvent is supplied to the receptacle 11 through an inlet 15, a sufficient volume of the solvent being maintained within the receptacle to insure its passage through the chamber 5 in countercurrent to the pasty mass. An outlet 16 at the opposite end of the chamber 5 permits the withdrawal of the solvent after its passage through the chamber and the accomplishment of the desired object.

From the foregoing, it will be observed that the method and apparatus hereinbefore described permit the rapid and efficient extraction of fatty material in a continuous and uniform manner, the solvent being withdrawn in a condition of maximum concentration of the fatty material while the thoroughly extracted pasty mass containing principally water and the solid matter separates in the conical bottom of the receptacle 11 and is withdrawn through the valve 14. The small amount of benzol contained in the pasty mass is removed by heating or steam distillation followed by condensation according to well understood processes. The possibility of continuous operation insures marked economy in the operation as well as a more thorough extraction and a more uniform product than is otherwise possible.

Various changes may be made in the details of operations without departing from the invention or sacrificing any of the advantages thereof.

I claim:

1. A continuous method of extracting fats, oils and the like from cocoa products, which comprises mixing the material with a sufficient quantity of water to provide a semi-fluid mass, causing the mass to travel by gravity countercurrent to a solvent for the fat or oil, whereby the substantially exhausted mass is progressively subjected to fresh solvent, withdrawing the solvent with the dissolved fat or oil after contact with the incoming semi-fluid mass, causing the solid material to settle from a body of fresh solvent and withdrawing the solid material after settling from the fresh solvent.

2. A continuous method of extracting fats, oils and the like from cocoa products, which comprises mixing the material with a sufficient quantity of water to provide a semi-fluid mass, stirring the mass while it travels by gravity in contact with a stream of solvent for the fat or oil flowing countercurrent thereto, whereby the substantially exhausted mass is progressively subjected to fresh solvent, withdrawing the solvent with the dissolved fat or oil after contact with the incoming semi-fluid mass, causing the solid material to settle from a body of fresh solvent and withdrawing the solid material after settling from the fresh solvent.

3. A continuous method of extracting fat from cocoa powder, which comprises mixing the cocoa powder with a volume of water sufficient to form a semi-fluid mass, subjecting the mass progressively to the action of a solvent containing a smaller proportion of dissolved fat, withdrawing the solvent after contact with the incoming mass and withdrawing the cocoa powder after settling from the fresh solvent.

4. A method for the continuous countercurrent extraction of cocoa products which comprises mixing the material with water to form a comparatively heavy, viscous liquid or pasty mass, passing the pasty mass by gravity through an inclined chamber equipped with means for agitation, forcing a non-miscible, lighter and more fluid solvent up through the same chamber by a difference in head on the light liquid, and separating the extracted pasty mass from a body of the fresh solvent by settling.

5. A continuous method of extracting fat from cocoa products, which comprises mixing the material to be extracted with a volume of water sufficient to form a semi-fluid mass, moving the mass by gravity and meanwhile subjecting it to the action of a solvent containing progressively smaller proportions of dissolved fat, separating the extracted material from fresh solvent by settling, and withdrawing the solvent after contact with the incoming mass.

In testimony whereof I affix my signature.

ROBERT ERASTUS WILSON.